(12) United States Patent
Meter

(10) Patent No.: US 7,648,585 B2
(45) Date of Patent: Jan. 19, 2010

(54) INCUBATOR AND METHOD FOR CLEANING THE INCUBATOR

(75) Inventor: Tjitze Meter, Veenendaal (NL)

(73) Assignee: HatchTech Group B.V., Veenendaal (NL)

( * ) Notice: Subject to any disclaimer, the term of this patent is extended or adjusted under 35 U.S.C. 154(b) by 473 days.

(21) Appl. No.: 10/534,449

(22) PCT Filed: Nov. 11, 2003

(86) PCT No.: PCT/NL03/00792

§ 371 (c)(1),
(2), (4) Date: Nov. 22, 2005

(87) PCT Pub. No.: WO2004/047527

PCT Pub. Date: Jun. 10, 2004

(65) Prior Publication Data

US 2006/0144341 A1    Jul. 6, 2006

(30) Foreign Application Priority Data

Nov. 11, 2002 (NL) .................................. 1021890

(51) Int. Cl.
*B08B 7/04* (2006.01)

(52) U.S. Cl. .......................... 134/19; 134/42; 119/300

(58) Field of Classification Search ................. 119/300, 119/306, 308, 310, 311, 314, 316, 317, 318, 119/319, 320; 134/19, 42
See application file for complete search history.

(56) References Cited

U.S. PATENT DOCUMENTS 1,460,349 A * 6/1923 Oakes ........................ 119/319
1,524,129 A * 1/1925 Grossman ................... 219/484

FOREIGN PATENT DOCUMENTS

| DE | 888329 | 8/1953 |
| FR | 954964 | 1/1950 |
| WO | WO 02/39812 | 5/2002 |

* cited by examiner

*Primary Examiner*—Michael Barr
*Assistant Examiner*—Saeed T Chaudhry
(74) *Attorney, Agent, or Firm*—The Webb Law Firm

(57) ABSTRACT

The invention relates to a method for cleaning an incubator and to an incubator designed for carrying out the method. The method involves disinfecting the incubator, or at any rate the climatic chamber and/or removable parts present in it during the incubation process, by means of a disinfecting heat treatment. Said heat treatment can comprise a step in which the incubator, or at any rate the climatic chamber, is heated to a temperature of at least 50° C., in particular a temperature of approximately 58° to 65° C. for at least 25 minutes. The invention further relates to an incubator, in which the temperature relating means used for the incubation process are further designed for carrying out a disinfecting heat treatment in the climatic chamber.

5 Claims, 1 Drawing Sheet

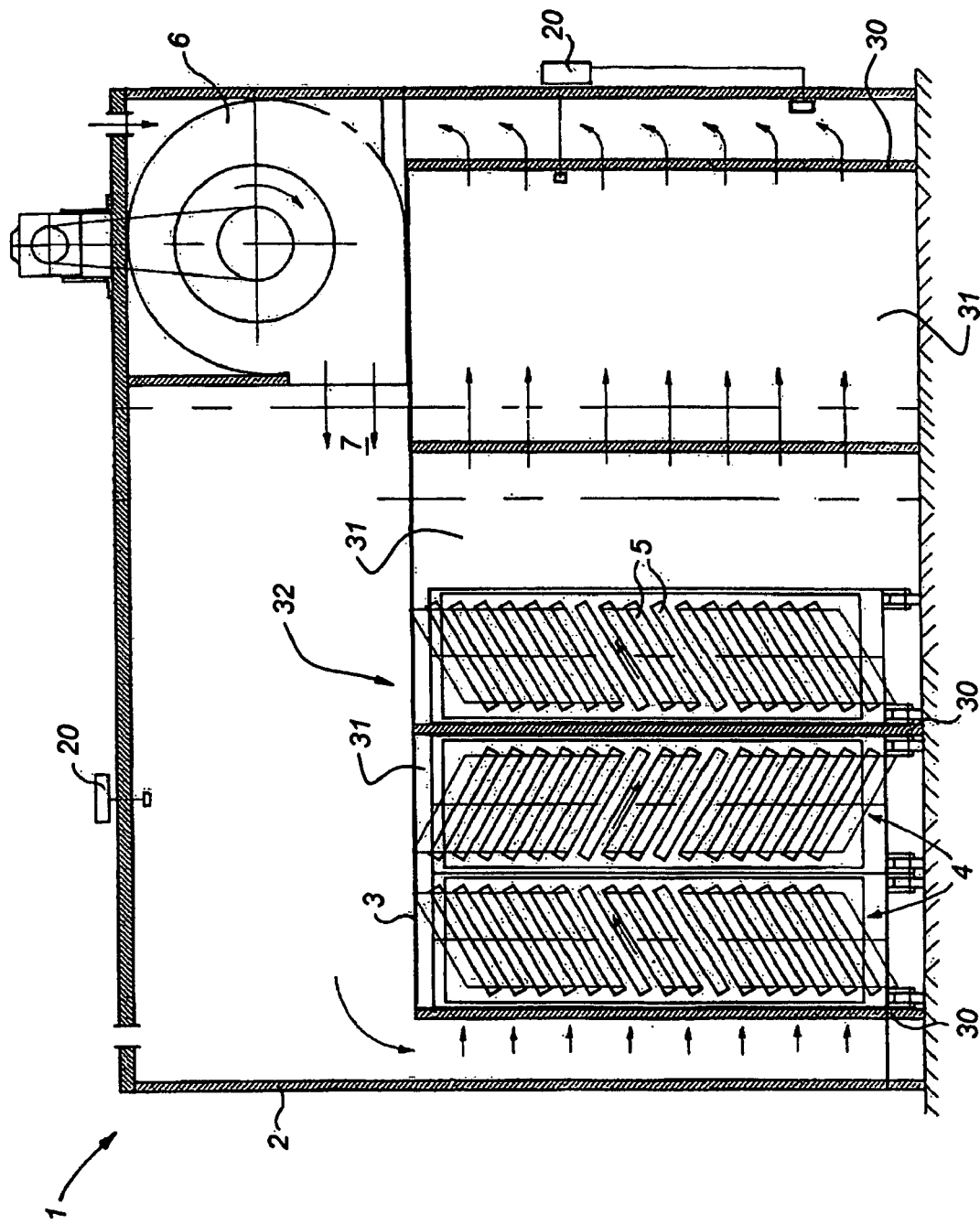

INCUBATOR AND METHOD FOR CLEANING THE INCUBATOR

BACKGROUND OF THE INVENTION

1. Field of the Invention

The present invention relates to a method for cleaning an incubator, involving disinfecting the incubator, or at any rate the climatic chamber and/or removable parts present in it during the incubation process.

2. Description of the Related Art

It is known from the prior art in the case of incubators to clean the latter after an incubation process and prior to a subsequent incubation process by means of, inter alia, a disinfection step. The incubator is generally first cleaned with water with or without the addition of chemicals, and is then disinfected by means of chemicals in a subsequent step. Prior to the disinfection by means of chemicals, and also often thereafter, the incubator, in particular the incubation chamber, is often then dried additionally with the aid of a fan. It is known that this cleaning is important in order to prevent cross-infections in the food chain. The fact is that the eggs and birds that have hatched from them in an earlier incubation process can be infected with bacteria, such as colis and salmonella, and without further cleaning steps will then pass on this infection also to a subsequent batch of eggs to be incubated and to the chicks to be hatched out from them. As will be clear, this must be avoided, which was the aim with the conventional method of cleaning incubators.

A disadvantage of the known, conventional method of cleaning incubators is, however, that the method of cleaning used does not satisfactorily reach all points in the incubator, or at any rate the incubating chamber. Cracks and scams are particularly difficult to clean thoroughly, so that there is a risk of infection sources remaining behind in them. A further disadvantage is that the chemicals used are harmful to the environment and also tend to attack the materials that are incorporated in the incubator.

SUMMARY OF THE INVENTION

The object of the present invention is to provide an improved method for cleaning an incubator, by means of which in particular the risk of the presence of infection sources remaining behind after the cleaning can be reduced to a far-reaching extent.

The abovementioned object is achieved according to the invention in the case of the method of the type mentioned at the beginning by the fact that the disinfection comprises a disinfecting heat treatment. Disinfecting heat treatments are known as such from the prior art. In such treatments an object is heated for a minimum length of time, which is laid down, for example, by government, at a minimum temperature, which is laid down, for example, by government. The length of time is generally shorter with increasing temperature. Various lengths of time and corresponding temperatures are prescribed for various types of infection sources. It is usual to work here with a constant temperature for a specific length of time, but the temperature can also vary according to a prescribed course or otherwise for a specific length of time.

The temperature at which an incubator for the hatchery is operated generally lies around 100° F., i.e. around 38° C. This temperature can vary by several degrees, depending on the type of chick to be hatched. The range generally lies within 3° C. around the abovementioned 38° C. If these temperatures are significantly exceeded, this can lead to damage to the chicks to be hatched. Disinfecting heat treatments differ from the incubation process by the fact that the temperature during disinfecting heat treatments will exceed 50° C., and in particular the temperature during a disinfecting heat treatment will rise above 55° C. The method according to the present invention, according to a more specific embodiment, is therefore in particular characterized in that the temperature for the disinfecting heat treatment exceeds 50° C., in particular exceeds 55° C.

According to a special embodiment, the heat treatment comprises one or more steps in which the incubator, or at any rate the climatic chamber and/or the removable parts belonging in it, is heated to a specific temperature for a length of time. Very particularly, in the method according to the invention the length of time in one of those steps is at least 25 minutes, generally at least 30 minutes at a specific temperature of at least 50° C., preferably lying in the range between 58 and 65° C.

According to a further special embodiment of the invention, the temperature during the disinfecting heat treatment will be a maximum of 150° C., preferably a maximum of 125° C., such as, for example, a maximum of approximately 100° C. This is with a view to reducing the stress on the incubator and on the durability of the materials used in it.

According to a further, very advantageous embodiment of the invention, the disinfecting heat treatment of the incubator, or at any rate the climatic chamber, is carried out using the heating means of that incubator that are provided for the incubation process. It is therefore not necessary to provide additional heating means. Only the manner of using those heating means need be adapted, and in particular this will amount to a modified temperature regulation. From efficiency considerations it is advantageous here according to the invention if during said disinfecting heat treatment said removable parts belonging in the climatic chamber are placed in the climatic chamber. What should be understood by such removable parts belonging in the climatic chamber is, for example, egg drawers or other drawers or trays on which the eggs for hatching out are lying, and by means of which the hatched-out chicks can possibly be easily removed subsequently from the incubator.

Prior to the disinfecting heat treatment, the incubator, or at any rate the climatic chamber and/or the removable parts belonging in it, according to the invention can first be cleaned with water with or without the addition of chemicals. It could also be conceivable to disinfect with chemicals prior to the disinfecting heat treatment, or possibly after it.

It will be clear that the disinfecting heat treatment in the case of the method according to the invention can be used as an additional step that complements the conventional method of cleaning incubators described at the beginning. The great advantage of the disinfecting heat treatment is that it also reaches the places of the incubator, or at any rate the climatic chamber, that are difficult or impossible to reach, since the temperature is relatively easy to bring to a specific value also at those places. However, the present invention ensures that with the use of the disinfecting heat treatment it is possible to dispense with many steps of the conventional methods of cleaning incubators.

The present invention also relates to an incubator comprising a climatic chamber and temperature regulating means for regulating the temperature in the climatic chamber during the incubation process, which incubator according to the invention is characterized in that the temperature regulating means are further designed for disinfecting, by means of a disinfecting heat treatment, the climatic chamber and any parts present in said chamber, in particular at temperatures above 50° C., preferably above 55° C.

According to a further special embodiment of the invention, in the case of the incubator the temperature regulating means are designed to heat the climatic chamber for the disinfecting heat treatment to a predetermined temperature during one or more steps for a predetermined length of time. The predetermined length of time and predetermined temperature may in this case, as already stated, have been specified by government, or will at any rate be lengths of time known from the literature with corresponding temperatures for destroying certain types of infection sources.

According to a preferred embodiment, in one of those steps the predetermined length of time will be at least 25 minutes, and the specific temperature will be at least 50° C., preferably approximately 58 to 65° C.

In order to ensure that the incubator and the materials and structural parts used in it are not subjected to excessive stress, the predetermined temperature will be a maximum of 150° C., and preferably a maximum of 125° C., such as, for example, a maximum of approximately 100° C.

BRIEF DESCRIPTION OF THE DRAWINGS

The present invention will be explained briefly below with reference to an incubator known from the prior art, namely NL 1.016.636 of the applicants. This explanation will be with reference to the single FIGURE, which is taken from NL 1.016.636.

DESCRIPTION OF THE PREFERRED EMBODIMENTS

The FIGURE shows an incubator 1 with an outside wall 2. A climatic chamber composed of three compartments 31 is formed in the incubator 1 by means of a ceiling 3 and inside walls 30. A number of trolleys 4 with trays 5 can be set up in each compartment 31 of the climatic chamber 32. The trolleys 4 and trays 5 each form so-called "removable parts that are present in the climatic chamber during the incubation process". A current of air, which is diagrammatically indicated by arrows, is generated in the incubator 1 by means of a pump or fan 6. Said current of air goes into the left-hand compartment through the perforated wall 30, passes through the trolleys and along the trays, and then passes through the likewise perforated wall 30 into the middle compartment 31 etc. until the air leaves the right-hand compartment 31 through the right-hand wall 30. Heating means for heating the air to be circulated are provided in the walls 30, or possibly elsewhere in the incubator. In addition, the incubator can further be provided with sensors 20, for example for measuring the $CO_2$ content in the current of air or other gas components, and also for measuring the temperature.

In the case of the method according to the invention the disinfecting heat treatment can be achieved by arranging the temperature regulating means in such a way that they can also raise the temperature of the current of air to a temperature suitable for a disinfecting heat treatment. It is also conceivable, if desired, to provide additional heating means and/or temperature regulating means for a disinfecting heat treatment. In addition, it is very well possible according to the invention for the trays 5 or trolleys 4 to be subjected to a disinfecting heat treatment in a separate heat treatment room.

The invention claimed is:

1. A method for cleaning an incubator having temperature regulating means for regulating the temperature in a climatic chamber during an incubation process, the method involving disinfection of at least one of a climatic chamber and removable parts present in the climatic chamber during the incubation process, wherein the disinfection comprises a disinfecting heat treatment performed on the climatic chamber within the incubator using the temperature regulating means of the incubator provided for the incubation process, wherein the temperature for the disinfecting heat treatment exceeds 55° C.

2. The method as claimed in claim 1, wherein the temperature for the disinfecting heat treatment does not exceed 150° C.

3. The method as claimed in claim 1, wherein the temperature for the disinfecting heat treatment does not exceed 100° C.

4. The method as claimed in claim 1, wherein at least one of the climatic chamber and removable parts are cleaned with water prior to the disinfection.

5. A method for cleaning an incubator having temperature regulating means for regulating the temperature in a climatic chamber during an incubation process, the method involving disinfection of at least one of a climatic chamber and removable parts present in the climatic chamber during the incubation process, wherein the disinfection comprises a disinfecting heat treatment performed on the climatic chamber within the incubator using the temperature regulating means of the incubator provided for the incubation process, wherein at least one of the climatic chamber and removable parts are heated between 58° to 65° C. for at least 25 minutes.

* * * * *

UNITED STATES PATENT AND TRADEMARK OFFICE
CERTIFICATE OF CORRECTION

PATENT NO. : 7,648,585 B2  Page 1 of 1
APPLICATION NO. : 10/534449
DATED : January 19, 2010
INVENTOR(S) : Tjitze Meter It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 948 days.

Signed and Sealed this

Twenty-third Day of November, 2010

David J. Kappos
*Director of the United States Patent and Trademark Office*